(12) United States Patent     (10) Patent No.: US 12,649,267 B2
McClarren et al.                  (45) Date of Patent:         Jun. 9, 2026

(54) FLOW RESTRICTING DEVICE

(71) Applicant: Adient US LLC, Plymouth, MI (US)

(72) Inventors: Patricia Jean McClarren, Ypsilanti,
MI (US); Zhijie Zhang, Canton, MI
(US); Cuitlahuac Aranda, Ramos
Arizpe (MX)

(73) Assignee: Adient US LLC, Plymouth, MI (US)

( * ) Notice:      Subject to any disclaimer, the term of this
patent is extended or adjusted under 35
U.S.C. 154(b) by 66 days.

(21) Appl. No.: 18/916,125

(22) Filed:      Oct. 15, 2024

(65)              Prior Publication Data

US 2026/0102951 A1      Apr. 16, 2026

(51) Int. Cl.
B29C 44/38          (2006.01)
(52) U.S. Cl.
CPC .................................... B29C 44/38 (2013.01)
(58) Field of Classification Search
CPC ..... B29C 44/38; B29C 44/425; B29C 45/036;
B29C 1/3026; B29C 1/3073; F16K 7/10;
B05B 1/3006; B05B 1/323; B05B 1/326;
B65D 47/26
USPC ........................................................ 239/577
See application file for complete search history.

(56)              References Cited

U.S. PATENT DOCUMENTS

| | | | | |
|---|---|---|---|---|
| 2,300,679 | A * | 11/1942 | Klein | B05B 1/00 239/455 |
| 2,355,683 | A * | 8/1944 | Sharp | F16K 15/03 137/515.7 |
| 3,762,437 | A * | 10/1973 | King, Sr. | F16K 15/16 239/207 |
| 4,095,615 | A * | 6/1978 | Ramsauer | F16K 15/033 137/151 |
| 4,846,406 | A * | 7/1989 | Christy | B05B 1/3006 285/125.1 |
| 5,099,877 | A * | 3/1992 | Fluegel | F16K 15/03 137/527 |
| 6,200,506 | B1 * | 3/2001 | Takei | B29C 44/351 264/46.7 |
| 11,090,666 | B1 * | 8/2021 | Luckow | B05B 15/16 |

FOREIGN PATENT DOCUMENTS

| | | |
|---|---|---|
| JP | 2550006 Y2 | 10/1997 |
| JP | 2006069080 A | 3/2006 |
| JP | 5847463 B2 | 1/2016 |
| KR | 0184946 B1 | 5/1999 |
| KR | 100658597 B1 | 12/2006 |
| WO | 9116186 A1 | 10/1991 |

* cited by examiner

*Primary Examiner* — Umashankar Venkatesan
(74) *Attorney, Agent, or Firm* — Marshall & Melhorn,
LLC

(57)              ABSTRACT

A flow restricting device may have a hollow shaft having a
first end portion and a second end portion with an outlet. A
flow restricting gate may be located adjacent the second end
portion. The gate may have a tab that selectively blocks the
outlet.

19 Claims, 2 Drawing Sheets

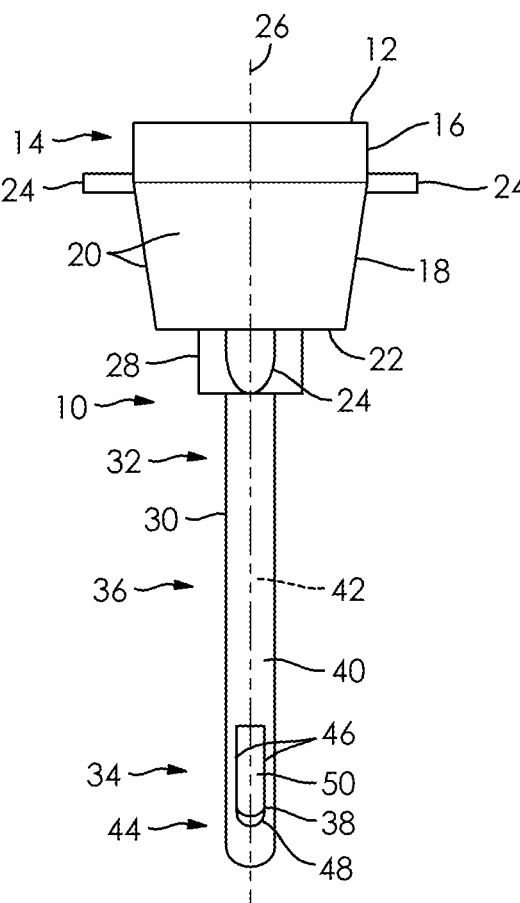
FIG. 1          FIG. 1A
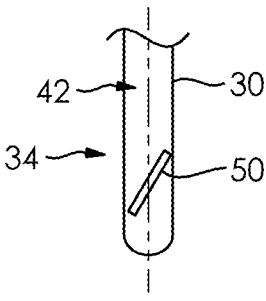
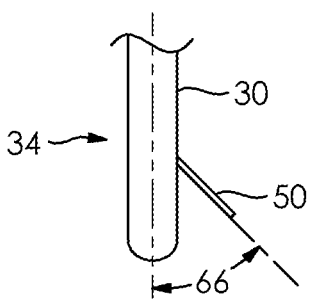
FIG. 2          FIG. 3

FLOW RESTRICTING DEVICE

FIELD

A flow restricting device is described and depicted. The device may be used with foaming equipment to control pressure within the device and a product mold.

BACKGROUND

Known foaming equipment attempts to control the amount and/or pressure of foam entering into a mold usually by metering out an estimated amount of foam to create the desired part. This process, however, is insufficient as the foam often exits the mold resulting in excess foam that spills out of the mold soiling the mold and wasting foam.

In view of the disadvantages associated with known part formation by foaming, it would be preferable to have a device and/or process by which the foam is better controlled.

SUMMARY

In one aspect, a flow restricting device may have a hollow shaft having a first end portion, and a second end portion with an outlet. The device may also have a flow restricting gate located adjacent the second end portion, the gate may have a tab having a first end portion, a second end portion and a body portion, wherein at least part of the body portion of the tab selectively blocks the outlet and wherein one of the end portions is pivotally connected to the shaft.

In another aspect the first end portion may be an open inlet adapted to receive a colloidal system having gas bubbles dispersed in a liquid substrate.

In another aspect, the hollow shaft may have a constant cross-section from the first end portion and to a central portion.

In another aspect, a hinge at the first end portion may pivot the second end portion away from the second end portion of the shaft.

In another aspect, a hinge at the first end portion may pivot the second end portion into the hollow shaft.

In another aspect, the tab may form an acute angle with the hollow shaft.

In another aspect, the tab may have a perforated connection with an exterior surface of the shaft.

In another aspect, the tab and the shaft may be unitary, one piece and integrally formed.

In another aspect, a foam flow restricting device may have a hollow shaft adapted to direct a foam product from an inlet portion to an outlet portion of the shaft. The device may also have a foam flow restricting gate comprising a first portion at least partially blocking the outlet portion and a second portion pivotally attached to an outer surface of the hollow shaft.

In another aspect, the first portion of the gate may at least partially overlap the outlet portion.

In another aspect, the first portion of the gate may be a complementary curvature to the outer surface of the shaft.

In another aspect, the first portion of the gate may have two parallel edges connected by a curved end.

In another aspect, a foam flow restricting device may have a hollow shaft adapted to direct a foam product to an outlet portion of the shaft. The device may also have a foam flow restricting gate, separable from the hollow shaft, located adjacent the outlet portion.

In another aspect, the gate may be slidingly engaged with the hollow shaft.

In another aspect, the gate may be a ring portion that extends at least partially about an outer surface of the shaft and a tab, connected to the ring portion, located adjacent the outlet portion of the shaft.

In another aspect, the tab may selectively block the outlet portion.

In another aspect, the tab may pivot away from the outlet portion.

In another aspect, the tab may selectively close off the outlet portion to prevent the foam product from existing or entering the hollow shaft.

BRIEF DESCRIPTION OF THE DRAWINGS

The above, as well as other advantages, will become readily apparent to those skilled in the art from the following detailed description when considered in the light of the accompanying drawings in which:

FIG. 1 is a schematic side view of one embodiment of a funnel;

FIG. 1A is a detail of a feature of FIG. 1;

FIG. 2 is a schematic cut-away side view of a feature of FIG. 1;

FIG. 3 is a schematic side view of a feature of the funnel of FIG. 2;

DETAILED DESCRIPTION OF THE PREFERRED EMBODIMENTS

Figure 4:
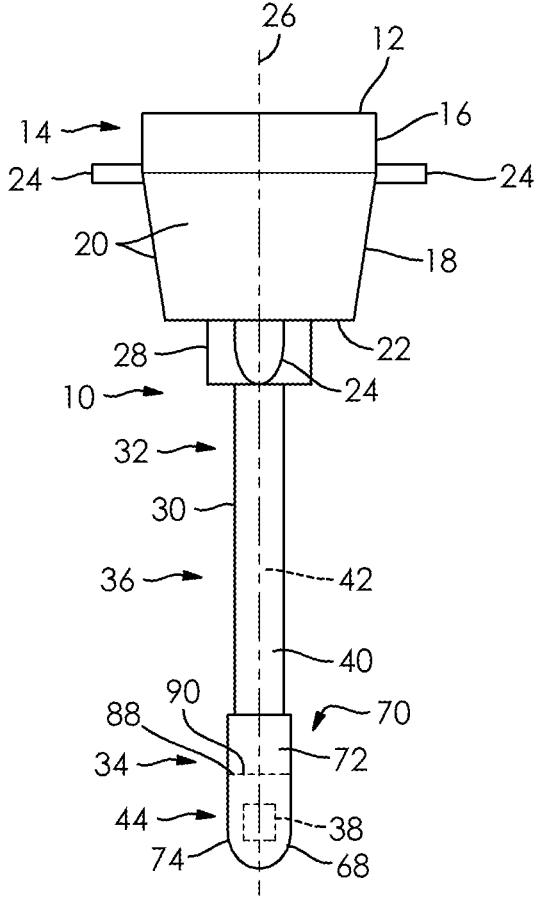
FIG. 4 is a schematic side view of another embodiment of the funnel.

It is to be understood that the device may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions, directions or other physical characteristics relating to the embodiments disclosed are not to be considered as limiting, unless the claims expressly state otherwise. As used herein, the terms generally and substantially include standard variations in tolerances and manufacturing for related goods and products.

Turning to FIG. 1 one embodiment of a funnel 10 is depicted. The funnel 10 may have an entrance 12. The entrance 12 may be such as in an upper portion 14 of the funnel 10. The entrance 12 may comprise an opening in which material may be located in the funnel 10.

The funnel 10 may be constructed in whole in part with polypropylene (PP), low-density polyethylene (LDPE), high-density polyethylene (HDPE), polyethene terephthalate (PET), polyvinyl chloride (PVC), acrylonitrile butadiene styrene (ABS) and/or polyethylene terephthalate glycol (PETG). Some of these materials may require additives to modify performance in areas of flexibility/stiffness, temperature resistance, and/or chemical resistance. While some materials are mentioned, others having similar performance properties may be used.

In some cases, the entrance 12 may be at least partially covered by a topper 16. The topper 16 may be selectively removable from the entrance 12. The topper 16 may prevent dirt, debris and other unintended items from passing through the entrance 12. Thus, in some instances topper 16 may function as a filter that filters materials entering the funnel 10. The topper 16 may also reduce the rate at which material backflows out of the funnel after foaming. The topper 16 may be constructed of a mesh and/or foam material.

A preferred material that may pass through the entrance 12 may be such as a colloidal system having gas bubbles dispersed in a liquid substrate, also known as a liquid foam or foaming material. In one case, the foaming material may be such as a polyurethane foam. While passing through the funnel 10, it may be preferred that the system is in a liquid state capable of movement through the funnel 10. In some cases, the funnel 10 and/or system may be pressurized to assist in moving the system through the funnel 10.

The topper 16 may be located above a hopper 18. The hopper 18 may be a receptable capable of receiving and temporarily storing at least a portion of the system. The hopper 18 may have an open top that may be selectively covered by the topper 16. Sidewalls 20 may extend upwardly from a base portion 22 of the hopper 18. In some cases, the hopper 18 may be tapered from the top to the base portion 22 such as in a truncated cone, but other shapes may be permissible. The base portion 22 of the hopper 18 may have one more openings adapted to selectively release the colloidal system.

One or more locator tabs 24 may be connected to the sidewalls 20 and/or the base portion 22. The tabs 24 connected to the sidewalls 20 may be cantilevered therefrom. In some cases, tabs 24 on the side walls 20 may extend generally opposite one another. The tabs 24 on the base portion 22 may extend generally parallel to a longitudinal axis 26 of the funnel 10. In some cases, the tabs 24 may be aligned with the axis 26 and be located below the hopper 18.

The locator tabs 24 may be used to position the funnel 10 in a desired orientation within a delivery system (not shown). The delivery system may be one that at least temporarily receives the funnel 10. The delivery system may be stationary, or it may move. In the case of a stationary delivery system, a mold (not shown) may be located under the funnel 10 or the funnel may be positioned such that it is inserted into the mold. In the case where the delivery system moves, the delivery system may locate the funnel 10 over a mold or the funnel may be positioned such that it is inserted into the mold.

One or more adaptor portions or locator blocks 28 may be connected to the hopper 18. In FIG. 1, a single adaptor portion 28 is directly connected to the base portion 22 of the hopper 18. While a single adaptor portion 28 is shown, additional adaptor portions of various shapes, sizes and/or numbers may be used. The adaptor portion 28 may be tubular with one or more openings aligned with the base portion openings. The adaptor portion 28 may have a smaller diameter than a diameter of the hopper 18. The adaptor portion 28 may function to direct the colloidal system into a funnel shaft 30.

An upper portion, or first end portion 32, of the funnel shaft 30 may be connected to an outlet of the adaptor portion 28. The funnel shaft 30 may be hollow from the first end portion 32 to a second end portion 34. A central portion 36 may be located between the first end portion 32 and the second end portion 34. The funnel shaft 30 may be generally tubular with a substantially constant cross-section from the first end portion 32 to at least the central portion 36. The funnel shaft 30 may be of various lengths. The second end portion 34 may be closed and the closure may be formed from a tapering or rounding off or squaring off of the second end portion 34.

The funnel shaft 30 may extend along the longitudinal axis 26 of the funnel 10 and extend downwardly from the adaptor portion 28 and may be centered thereon. In addition, the funnel shaft 30 may be substantially enclosed except for the above-mentioned opening connected to the outlet of the adaptor portion 28, and an outlet as described below.

A funnel shaft outlet 38 may be formed in the central portion 36 and/or the second end portion 34 of the funnel shaft 30. The outlet 38 may be comprised of one or more openings in an outer surface 40 of the funnel shaft 30 that permits an interior portion 42 of the funnel shaft 30 to communicate with an area 44 outside of the funnel shaft 30, as shown in FIGS. 1 and 1A.

The outlet 38 may be shaped by two parallel walls 46 formed in the outer surface 40 of the funnel shaft 30. In one case, the walls 46 may generally extend parallel to the longitudinal axis 26 of the funnel 10. The walls 46 may be connected together by a lower portion 48 formed in the outer surface 40 of the funnel shaft 30. The lower portion 48 may be curved or arc-shaped. While one shape of an outlet 38 is mentioned, other shapes may be used. The outlet 38 may be one-piece, unitary and integrally formed with the funnel shaft 30.

A flow restricting gate 50 may be located adjacent and at least partially covering the outlet 38. The gate 50 may be one-piece, unitary and integrally formed with the funnel shaft 30, or it may be separately attached thereto. The gate 50 may have a similar shape and size to the outlet 38, but in some embodiments, the gate 50 may be sized and shaped to at least partially overlap the outlet 38 (thus larger than the outlet) or to be smaller than the outlet 38 so that it may at least partially selectively fit into the interior portion 42 of the funnel shaft 30.

In one embodiment depicted in FIG. 1A, the gate 50 may be comprised of a tab 52 having a first end portion 54, a second end portion 56 and a body portion 58 extending between the portions 54, 56. The first end portion 54 may be directly attached to the funnel shaft 30.

The tab 52 may also have two parallel edge portions 60 connected by the second end portion 56. The edge portions 60 may extend generally parallel the outlet walls 46. The edge portions 60 may have the same shape as the outlet walls 46, they may have a generally complimentary shape or they may have a different shape. Similarly, the second end portion 56 may have the same shape, have a generally complimentary shape or have a different shape compared to the lower portion 48 of the outlet 38.

In an initial condition, in one embodiment, the first end portion 54 of the tab 52, the edge portions 60 of the tab 52 and/or the second end portion 56 of the tab 52 may be directly connected to the shaft 30 through one or more tags 62. In one example, depicted in FIGS. 1A, the tags 62 may be part of one or more perforations 64 that extend between the first end portion 54, the edge portions 60 and/or the second end portion 56 of the tab 52 and the funnel shaft 30. The number and/or type of perforations 64 may be varied according to location to provide different degrees or amounts of pressure required to at least partially break the tab 52 free of the funnel shaft 30. Preferably, the number or type of perforations 64 at the connection between the first end portion 54 of the tab 52 and the funnel shaft 30 do not release the first end portion 54 from the funnel shaft 30, but permits it to function like a hinge, under normal operating conditions of the funnel 10. In another embodiment, the first end portion 54 of the tab 52 may be connected to the funnel shaft 30 through a scored, indented and/or thinned connection, which may provide the hinge function as well.

The pressure of the colloidal system extending through the funnel shaft 30 can be sufficient to break the tags 62 and extend the tab 52 outward from the outer surface 40 of the funnel shaft 30, such as depicted in FIG. 3. An acute angle 66 may be formed between the outwardly extended tab 52 and the longitudinal axis 26 of the funnel 10.

The tab 52 and/or outlet 38 may function to restrict or control the colloidal system as it exits the funnel shaft 30 and/or end of the device and flow into the mold. For example, the size and/or shape of the tab 52 and/or outlet 38, the degree of flexibility of the hinge the number of perforations 64, and/or and the position of the tab 52 with respect to the outlet 38 may directly impact the pressure of the colloidal system within the shaft 30 and/or the mold.

As the colloidal system exits the funnel shaft 30 it may begin to expand and/or harden. The expanding and/or hardening system may put pressure on the outwardly extending tab 52 and move it against the system exiting the outlet 38. In such a condition, the system may move the tab 52 back into alignment with the outer surface 40 of the funnel shaft 30. This position may be sufficient to close off the funnel shaft 30 and prevent further amounts of the system from exiting the funnel shaft 30 and further exiting the entrance 12. In other embodiments or conditions, the expanding and/or hardening system may push the tab 52 into the interior portion 42 of the funnel shaft 30, such as depicted in FIG. 2. It can be appreciated that the location of the tab 52 in the funnel shaft 30 in this position may also function to block the colloidal system from exiting the funnel shaft 30 and further exiting the entrance 12.

In either case, the tab 52 may function to manage the pressure of the colloidal system in the mold. A pressure management in the mold may be beneficial to prevent certain defects such as pressure collapses. Pressure management in the mold may also be beneficial to prevent the system from expanding outside or beyond the mold through the funnel device, which results in waste.

Figure 5:
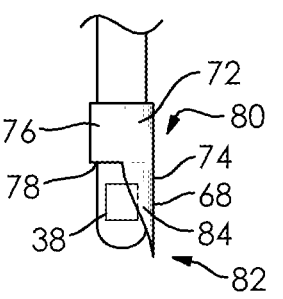
FIG. 5 is a schematic side view of a feature of the funnel of FIG. 4.
Figure 6:
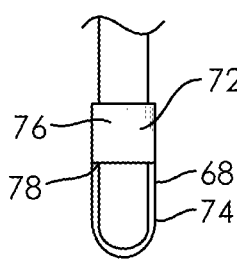
FIG. 6 is a schematic back view of the feature of the funnel of FIG. 4.

In FIGS. 4-6, another embodiment of a flow restricting gate 68 for the funnel 10 is depicted. Like reference number will be used for the same schematics in FIGS. 1-3 and 4-6. The gate 68 may have an attachment portion 70 that connects with the funnel shaft 30. In some cases, the gate 68 may be unitary, one-piece and integrally formed with the funnel shaft 30. In other cases, the gate 68 may be separately formed and attached to the funnel shaft 30.

In the latter case, the attachment portion 70 may be such as a clip or ring that has a complementary shape to at least a portion of the funnel shaft 30. As shown in the figures, the attachment portion 70 may be a ring 72 that extends at least partially about the funnel shaft 30. The funnel shaft 30 may be located within the ring 72, such that the ring 72 may be slid onto the funnel shaft 30. The ring 72 may be positioned adjacent the second end portion 34 of the funnel shaft 30.

The attachment portion 70 may also have a tab 74. The tab 74 may be connected to the ring 72. The tab 74 may be unitary, one piece and integrally formed with the ring 72 or it may be separately attached thereto. In some cases, the tab 74 may at least partially follow the curved contour of the ring 72. Thus, in some embodiments, the tab 74 may have a partial curved or arc-shape. The curve may continue through the length of the tab 74 or the tab 74 may have a flattened blade portion.

The tab 74 may extend tangentially away from an outer portion 76 diameter of the ring 72. In one case, the tab 74 may extend from a bottom edge 78 of the ring 72 in a cantilevered fashion. The tab 74 may have a greater longitudinal extension than a longitudinal extension of the ring

72. In other words, the tab 74 may extend a greater degree along the longitudinal axis 26 of the funnel 10 than the ring 72.

The tab 74 may have a first end portion 80, a second end portion 82 and a body portion 84 extending between the portions 80, 82. The first end portion 80 may be directly attached to the ring 72.

The tab 74 may also have two parallel edge portions 86 extending from the first end portion 80 that are connected by the second end portion 82. The edge portions 86 may extend parallel the outlet walls 46. The edge portions 86 may have the same shape as the outlet walls 46, they may have a complimentary shape or they may have a different shape. Similarly, the second end portion 82 may have the same shape, have a complimentary shape or have a different shape compared to the lower portion 48 of the outlet 38.

The first end portion 80 may be connected to the ring 72 by a plurality of tags 88. The tags 88 may be part a series of perforations 90 between the first end portion 80 and the ring 72. The number and/or type of perforations 90 may be varied. Preferably, the number or type of perforations 90 between the first end portion 80 and the ring 72 permits the connection to function like a hinge, under normal operating conditions of the funnel 10. In other cases, the connection may scored and/or thinned so that it forms the hinge with or without the perforations 90 and tags 88. In yet other cases, the connection may be of the same thickness as the rest of the gate 68.

From the above, it can be appreciated that in some cases the tab 74 may be selectively biased or moved while in other cases the tab 74 may be generally fixed. The colloidal system may move the tab 74 or not as it exits the shaft 30. In either case, the tab 74 may function to direct and/or disperse the colloidal system into a mold. In other words, the tab 74 may control the quantity and pressure of colloidal system entering the mold. If movable, the colloidal system may move the tab 74 into an acute angle with the longitudinal axis 26 of the funnel 10.

The tab 74 may be positioned substantially entirely covering or partially covering the outlet 38. The variability in position may be provided by the ring 72. In other words, the ring 72 may be located longitudinally anywhere along the shaft 30 to position the tab 74 anywhere with respect to the outlet 38. Similarly, the ring 72 may be rotated in any position about the shaft 30 again to position the tab 74 anywhere with respect to the outlet 38.

As the colloidal system exits the funnel shaft 30 it may begin to expand and/or harden. The expanding and/or hardening system may put pressure on the tab 74 and move the tab 74 against the system exiting the outlet 38. In such a condition, the system may move the tab 74 into alignment, or generally parallel, with the outer surface 40 of the funnel shaft 30. This position may be sufficient to close off the funnel shaft 30 and prevent further amounts of the system from entering or exiting the funnel shaft 30. In other embodiments or conditions, the expanding and/or hardening system may push the tab 74 into the funnel shaft 30. It can be appreciated that the location of the tab 74 in the funnel shaft 30 in this position will also function to block the colloidal system from entering or exiting through the funnel shaft 30 when the mold is filled the desired amount.

It is also not necessary for the tab 74 to move to effectively block the system from entering or exiting through the shaft 30. If the tab 74 is positioned over and adjacent to the outlet 38, it may sufficiently block the system from entering or exiting through the shaft 30 when the mold is filled the desired amount.

In either case, the tab 74 may function to manage the pressure of the colloidal system in the mold. A pressure management in the mold may be beneficial to prevent certain defects such as pressure collapses. Pressure management in the mold may also be beneficial to prevent the system from expanding past or beyond the mold through the funnel device, which results in waste.

In accordance with the provisions of the patent statutes, the present device has been described in what is considered to represent its preferred embodiments. However, it should be noted that the device can be practiced otherwise than as specifically illustrated and described without departing from its spirit or scope.

What is claimed is:

1. A flow restricting device, comprising:
a hollow shaft having a first end portion, and a second end portion with an outlet; and
a flow restricting gate located adjacent the second end portion, the gate comprising a tab having a first end portion, a second end portion and a body portion, wherein at least part of the body portion of the tab selectively blocks the outlet and wherein one of the end portions is pivotally connected to the shaft,
wherein the tab has a perforated, indented, scored, or thinned connection with an exterior surface of the shaft.

2. The device of claim 1, wherein the first end portion is an open inlet adapted to receive a colloidal system having gas bubbles dispersed in a liquid substrate.

3. The device of claim 1, wherein the hollow shaft has a constant cross-section from the first end portion and to a central portion.

4. The device of claim 1, wherein a hinge at the first end portion pivots the tab away from the second end portion of the shaft.

5. The device of claim 1, wherein a hinge at the first end portion pivots the tab into the hollow shaft.

6. The device of claim 1, wherein the tab forms an acute angle with the hollow shaft.

7. The device of claim 1, wherein the tab and the shaft are unitary, one piece and integrally formed.

8. A foam flow restricting device, comprising:
a hollow shaft adapted to direct a foam product to an outlet portion of the shaft;

a foam flow restricting gate, separable from the hollow shaft, located adjacent the outlet portion,
wherein the gate has a ring portion that extends at least partially about an outer surface of the shaft and a tab, connected to the ring portion, located adjacent the outlet portion of the shaft.

9. The device of claim 8, wherein the gate is slidingly engaged with the hollow shaft.

10. The device of claim 8, wherein the tab selectively blocks the outlet portion.

11. The device of claim 8, wherein the tab pivots away from the outlet portion.

12. The device of claim 8, wherein the tab selectively closes off the outlet portion to prevent the foam product from re-entering to flow backwards through the shaft.

13. A flow restricting device, comprising:
a hollow shaft having a first end portion, and a second end portion with an outlet; and
a flow restricting gate located adjacent the second end portion, the gate comprising a tab having a first end portion, a second end portion and a body portion, wherein at least part of the body portion of the tab selectively blocks the outlet and wherein one of the end portions is pivotally connected to the shaft, wherein the tab and the shaft are unitary, one piece and integrally formed.

14. The device of claim 13, wherein the first end portion is an open inlet adapted to receive a colloidal system having gas bubbles dispersed in a liquid substrate.

15. The device of claim 13, wherein the hollow shaft has a constant cross-section from the first end portion and to a central portion.

16. The device of claim 13, wherein a hinge at the first end portion pivots the tab away from the second end portion of the shaft.

17. The device of claim 13, wherein a hinge at the first end portion pivots the tab into the hollow shaft.

18. The device of claim 13, wherein the tab forms an acute angle with the hollow shaft.

19. The device of claim 13, wherein the tab has a perforated, indented, scored, or thinned connection with an exterior surface of the shaft.

* * * * *